United States Patent Office 3,286,692
Patented Nov. 22, 1966

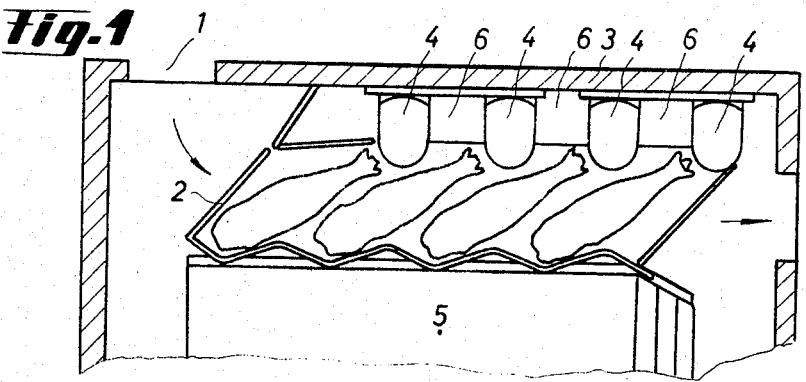
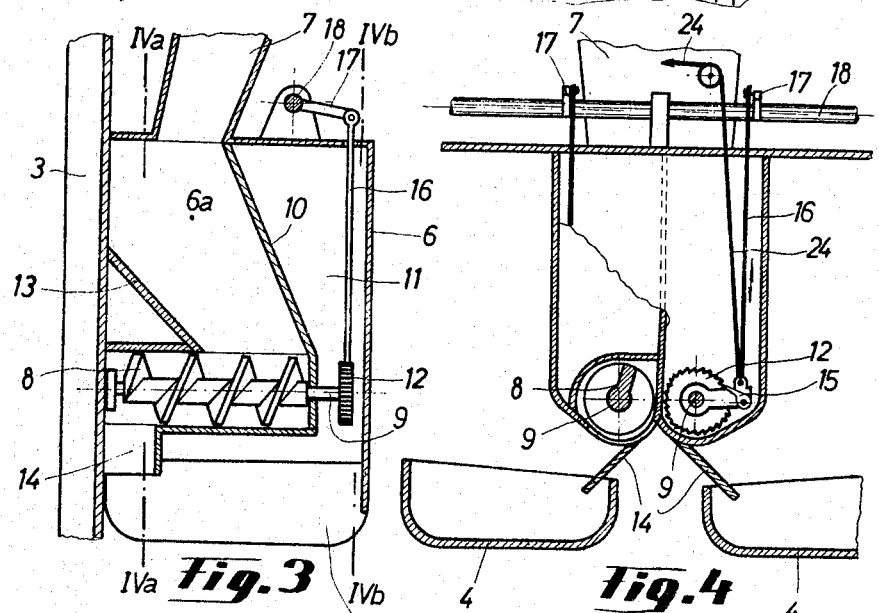
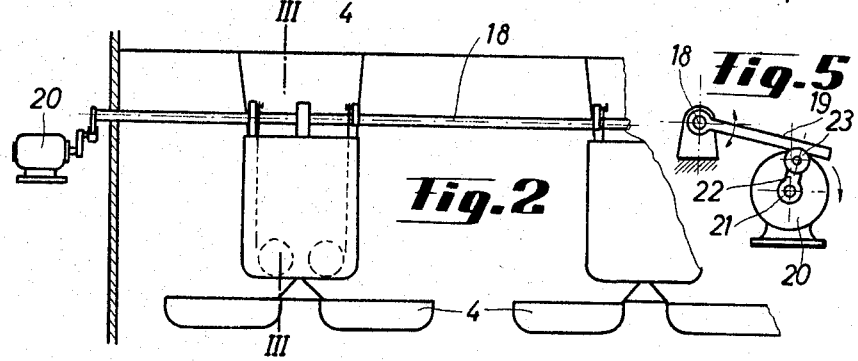

3,286,692
DEVICES FOR AUTOMATICALLY FEEDING CONCENTRATED FODDER INTO MILKING STALL MANGERS
Otto Metzger, Hof Backensholz, Ohrstedt, Husum, Germany
Filed Jan. 25, 1965, Ser. No. 427,710
Claims priority, application Germany, Jan. 29, 1964, M 59,723
4 Claims. (Cl. 119—52)

The present invention relates to a power operated device for feeding cows during the time while they are being milked.

The device is suitable for use in dispensing relatively expensive concentrated fodder or dairy concentrates which are currently used for feeding livestock. The device comprises a manger or feed box for each cow. An individual screw conveyor is associated with each feed box. Feed from a common supply is separately metered into each feed box by its individual screw conveyor. Each screw conveyor is intermittently rotated by a ratchet wheel driven by a cooperating pawl. All of the pawls are reciprocated circumferentially of their respective ratchet wheels by a motor driven oscillating shaft common to all of the pawls. Individual means are provided for adjusting the portion of its reciprocatory movement during which each pawl engages its associated ratchet wheel whereby the amount of feed dispensed to each animal may be individually adjusted according to its productive needs.

The concentrated feed is expensive and overfeeding a cow with a low milk production involves an economic waste. On the other hand, failure to dispense sufficient feed to a cow of large milk production results in a loss of the milk which would otherwise have been produced.

The invention is described in greater detail in the following specification with reference to the accompanying drawing forming a part hereof.

In the drawing:
FIGURE 1 is a plan view of a walk-through milking stall embodying the invention and arranged for the simultaneous accommodation of four cows.

FIGURE 2 is an enlarged fragmentary plan view of the arrangement shown in FIG. 1, the cows being omitted.

FIGURE 3 is an enlarged fragmentary view in sectional side elevation showing one of the screw conveyors and its associated feed box, the view being taken along the line III—III of FIG. 2.

FIGURE 4 is a sectional view in front elevation the left hand portion of which is taken along the line IVa of FIG. 3 and the right hand portion being taken along the line IVb of FIG. 3.

FIGURE 5 is a fragmentary end view showing the motor and the oscillating shaft which is driven thereby.

Figure 6:
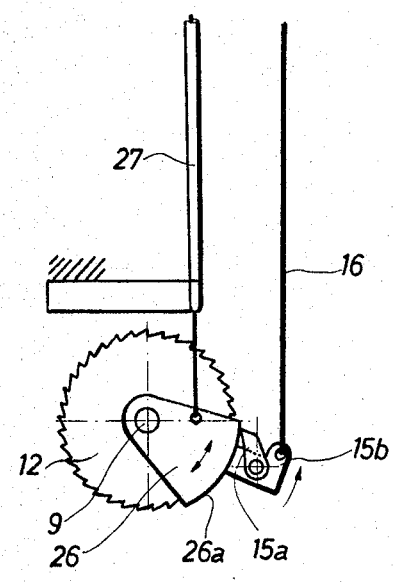
FIGURE 6 is a fragmentary view showing a modified form of means for adjusting the individual output of each screw conveyor.

Referring to FIG. 1, the cows enter the building through a door 1 and an opened gate 2 which is shown in its closed position. The cows stand in herringbone formation obliquely with respect to a wall 3 of the building, each cow being positioned to eat from an individual manger or feed box 4. The udders of the cows are conveniently accessible for milking by an attendant who moves in an operating area or gangway 5 arranged at a lower level.

In accordance with the invention the mangers 4 are to be supplied with concentrated fodder in as simple a manner as possible during the entire milking period, and the arrangement is to be such that all of the mechanical parts are readily accessible, and that troubles can be corrected readily by mechanically unskilled or semi-skilled farm personnel. To this end a supply container 6 for concentrated fodder is provided laterally and above each manger 4. The supply container 6 is charged with concentrated fodder via chutes 7 out of storage facilities (not shown) disposed above the milking area. In the illustrated embodiment the arrangement is such that one supply container 6 is provided between two adjacent mangers 4, whereby the pair of adjacent mangers 4 may be supplied simultaneously. This supply container 6, which is of substantially rectangular cross sectional configuration in a horizontal plane, includes at its lower end two short screw conveyors 8, the shafts 9 of which extend through an intermediate partition wall 10 and each having a ratchet wheel 12 mounted thereon disposed in the empty space 11. On the side facing the wall 3 a downwardly sloping wall 13 is arranged within the container 6, whereby the end of the screw conveyor at the side of the wall 3 is covered at its upper portion. This prevents the concentrated fodder in the supply container from passing directly through the screw conveyor and past a lateral slide 14 into the manger 4 spaced therebelow.

Preferably the pair of screw conveyors 8 have a right and a left hand pitch and are rotated by their respective ratchet wheels 12 in opposite directions. To this end a lever 15 is pivotally supported on the shaft 9 of each of the screw conveyors 8 and each lever 15 carries near its free end a spring-pressed pawl 15a in continuous engagement with the teeth of the ratchet wheel 12 a series of ropes or cables is arranged wherein each has its lower end secured to one of the pawl carrying levers 15 and its upper end secured to one of a series of arms 17 mounted on a common horizontal oscillating shaft 18 extending across all of the supply containers 6. This shaft 18 is rocked or rotated back and forth about its longitudinal axis with a low frequency of oscillation, whereby the arms 17 are alternately lifted and lowered causing the rope or cable connections 16 to raise and lower the pawl levers 15 in unison. Upon each lifting movement the ratchet wheel is driven in its forward direction and thus the screw conveyor 8 is rotated through a corresponding angle, whereby only a small metered amount of concentrated fodder is delivered by each screw conveyor 8 from the supply container 6a and fed via the slide 14 into its associated manger 4. The number of strokes of the pawl levers 15 and their angular movements are such that a predetermined average amount of fodder is dispensed to each of the mangers 4 during the course of entire milking period. This average amount of concentrated fodder should correspond to the average milk capacity of the cows being milked. In order to achieve the reciprocatory pivoting movement of the pawl levers 15 the oscillating shaft 18 has mounted on its one end a lever 19, and a small geared motor 20 adjacent to the lever 19 carries a crank arm 22 on its shaft 21. The crank arm 22 is provided with a roller 23 at its free end having a circumferential groove receiving the lever 19. Thus each revolution of the motor shaft 21 causes lever 19 to be lifted and lowered again, whereby the shaft 18 is rotated through a corresponding desired angle back and forth. By means of this oscillating rotation of the shaft 18 the arms 17 carrying the ropes or cables 16 are pivoted upwardly and downwardly, thereby causing the aforementioned pivoting movement of the pawl levers 15. Under consideration of corresponding lengths of the lever arms 17 and 19 and the crank arm 22 the drive shaft 21 of the motor 20 will make, for example, three revolutions per minute, and thereby it is possible to apportion the feeding of the average amount of concentrated fodder corresponding to the average capacity of a milk cow into the mangers over the entire period of milking which takes about 15 minutes, so that the cows will always keep quiet during the milking period.

However, since the milk capacity of the individual cows varies considerably, it is necessary to apportion increased amounts of concentrated fodder for corresponding capacities, lying above the average capacity of the individual cows. In order to take care of this increased ration, an additional rope 24 (see FIG. 4) is shown secured to the free end of the pawl lever 15 which extends upwardly up to below the ceiling of the milking box and then around guide rollers and downwardly again to the gangway 5 for convenient access by the milker. Thus, the milker is in a position to rotate any desired screw conveyor 8 by pulling the associated rope 24 one or more times when the conveyor would otherwise be stationary, in order to supply the manger of the respective cow with an additional amount of concentrated fodder.

FIG. 6 shows an automatic system for apportioning differing amounts of concentrated fodder to be fed into the mangers 4. Here also a ratchet wheel 12 is provided cooperating with the pawl 15a of a pawl lever 15b. In this case the pawl lever may be pivoted up and down with greater speed than in FIG. 4 if the screw conveyor has a smaller conveying capacity for each revolution. Between the pawl 15a, a sector or segment 26 is provided which is pivotally supported on the shaft 9 and which has a circumferential edge 26a extending circumferentially and axially the teeth of the ratchet wheel 12 whereby the pawl 15a is prevented from engaging the ratchet wheel 12. If, upon a full stroke of the pawl, an angular displacement corresponding to approximately eight teeth takes place, then the adjustment range of the segment is arranged in such a manner that five or six teeth of the full stroke may be covered, i.e. the pawl 15a is prevented from engaging the ratchet wheel 12 over a circumferential path corresponding to five or six teeth. Thus the advance may be limited to only two or three teeth.

It will be noted that the segment 26 may be adjusted in a plurality of steps. Thereby it is possible to dose the amount of fodder for each individual cow very precisely, for example by means of a Bowden wire 27 actuable from the gangway 5. Of course other adjustment means may be used, and it is also possible to replace the segment by a movable abutment limiting the downward path of the pawl lever which is moved by the rope 16 in the described manner.

As already mentioned in the beginning a separate supply container 6 of the type described may be provided for each manger 4 having only one screw conveyor 8 arranged laterally and above the manger, but for reasons of installation it is advantageous to construe the supply container in such a manner, that by a pair of screw conveyors simultaneously two adjacent mangers may be supplied whereby the installation is facilitated. The supply containers form a combined unit which may be mounted on the wall 3 of the milking box so that thereupon merely the continuous shaft 18 has to be mounted. The invention provides an especially simple device for automatically supplying the individual mangers with concentrated fodder, which may be inspected at any time and in which possibly arising troubles may be corrected at any time by the milker himself. Additionally, only a small geared motor with a very small capacity is required and which merely requires to be switched-on, after the cows have entered the milking area, whereupon immediately the automatic supply of the mangers with concentrated fodder starts.

What I claim is:

1. A feed dispensing device of the class described, comprising: a plurality of feed boxes; feed supply means; a screw conveyor for each feed box, said conveyor delivering a predetermined metered amount of feed from said supply means to its associated feed box in response to rotation of said conveyor through a predetermined angular displacement; separate pawl and ratchet means individually connected to each screw conveyor for rotation thereof; an oscillating motor driven shaft connected to all of said pawl and ratchet means for simultaneously advancing all of said screw conveyors through an angular displacement during the course of each oscillation thereof; and adjustment means individual to each of said pawl and ratchet means for separately adjusting the angular displacement imparted to each screw conveyor in response to each oscillation of said shaft.

2. A device according to claim 1, wherein said pawl and ratchet means comprises a ratchet wheel connected to rotate said screw conveyor and an advancing pawl engageable with said ratchet wheel, said pawl being reciprocated circumferentially of said ratchet wheel by said oscillating shaft, and in which said adjustment means comprises a circumferentially movable guard member for maintaining said pawl disengaged from said ratchet wheel throughout an adjustable portion of each reciprocation thereof.

3. A device according to claim 2, wherein said screw conveyor comprises a shaft for rotation thereof; in which said ratchet wheel is mounted on said shaft of said screw conveyor, and in which said guard member is pivotally mounted on said conveyor shaft, said guard member being of arcuate configuration concentric with said conveyor shaft and covering a predetermined peripheral portion of said ratchet wheel.

4. A device according to claim 1, further comprising a Bowden wire connected to said adjustment means for remotely adjusting said angular displacement.

References Cited by the Examiner
UNITED STATES PATENTS

| | | | |
|---|---|---|---|
| 1,192,663 | 7/1916 | Masek | 119—56 |
| 1,392,311 | 10/1921 | Egeland | 222—70 |
| 2,652,026 | 9/1953 | Iddings | 119—56 |
| 2,794,576 | 6/1957 | Reynolds | 119—53 X |
| 2,942,574 | 6/1960 | Golay | 119—52 X |
| 3,144,173 | 8/1964 | France et al. | 119—53 |
| 3,157,157 | 11/1964 | Clay et al. | 119—51.11 |

SAMUEL KOREN, *Primary Examiner.*

ALDRICH F. MEDBERY, *Examiner.*